United States Patent
Jitkoff et al.

(10) Patent No.: US 9,325,775 B2
(45) Date of Patent: Apr. 26, 2016

(54) CLIPBOARD

(75) Inventors: John Nicholas Jitkoff, Palo Alto, CA (US); Alexander Friedrich Kuscher, San Francisco, CA (US)

(73) Assignee: Google Inc., Mountain View, CA (US)

( * ) Notice: Subject to any disclaimer, the term of this patent is extended or adjusted under 35 U.S.C. 154(b) by 248 days.

(21) Appl. No.: 13/610,763

(22) Filed: Sep. 11, 2012

(65) Prior Publication Data

US 2015/0207850 A1 Jul. 23, 2015

(51) Int. Cl.
*G06F 3/0482* (2013.01)
*H04L 29/08* (2006.01)
*G06F 3/0484* (2013.01)
*G06F 21/62* (2013.01)
*H04W 4/20* (2009.01)
*H04W 12/06* (2009.01)

(52) U.S. Cl.
CPC .............. *H04L 67/06* (2013.01); *G06F 3/0482* (2013.01); *G06F 3/0484* (2013.01); *G06F 21/62* (2013.01); *H04W 4/206* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 2004/0153974 A1* | 8/2004 | Walker, Jr. | 715/531 |
| 2008/0288301 A1* | 11/2008 | Emling et al. | 705/4 |
| 2009/0100503 A1* | 4/2009 | Doyle | 726/3 |
| 2010/0058214 A1* | 3/2010 | Singh et al. | 715/769 |
| 2012/0096368 A1 | 4/2012 | McDowell | |
| 2012/0246573 A1* | 9/2012 | Arokiaswamy | 715/748 |
| 2013/0304815 A1* | 11/2013 | Puente et al. | 709/204 |

OTHER PUBLICATIONS

"Seamlessly Store Your Clipboard in the Cloud", Clipcloud, last viewed Jun. 17, 2012, retrieved from <http://www.getclipcloud.com>.
"Welcome to Your New Clipboard!" Clipcloud Features—Overview, last viewed Jun. 17, 2012, retrieved from <http://www.getclipcloud.com/features>.
"Features—Local Clipboard History", Clipcloud Features—Local Clipboard History, last viewed Jun. 17, 2012, retrieved from <http://www.getclipcloud.com/features/local-history>.
"Features—Multiple Devices", Clipcloud Features—Access From Multiple Devices, last viewed Jun. 17, 2012, retrieved from <http://www.getclipcloud.com/features/multiple-devices>.
"Features—Search", Clipcloud Features—Powerful Search, last viewed Jun. 17, 2012, retrieved from <http://www.getclipcloud.com/features/search>.
"Store Your Clipboard Items in the Cloud With ClipCloud [Mac]", MakeUseOf, Jul. 5, 2011, retrieved from <http://www.makeuseof.com/tag/store-clipboard-items-cloud-clipcloud-mac>.
"Cloud Clipboard description", Cloud Clipboard 1.0, Softpedia, last viewed Jun. 17, 2012, retrieved from <http://mac.softpedia.com/get/Utilities/Cloud-Clipboard.shtml>.

* cited by examiner

*Primary Examiner* — Chris Parry
*Assistant Examiner* — Stephen Houlihan
(74) *Attorney, Agent, or Firm* — McDermott Will & Emery LLP

(57) ABSTRACT

The disclosed methods and systems for performing a paste operation based on clipboard data from a first device and a second device include receiving, at a second device, a request to paste a last copied data item at the second device, accessing, from a server, a first timestamp for first data stored on the server and associated with a clipboard of a first device, accessing, at the second device, a second timestamp for second data copied to a clipboard of the second device, and determining whether the last copied data item corresponds to the first data or the second data, by comparing the first timestamp and the second timestamp. When the last copied data item corresponds to the first data, downloading the first data from the server, when the last copied data item corresponds to the second data, pasting the second data from the second device.

21 Claims, 6 Drawing Sheets

CLIPBOARD

BACKGROUND

The subject disclosure relates generally to data management, and more particularly to performing a paste operation based on clipboard data from a first device and a second device.

Copying and pasting of files is currently performed between different applications running on the same client device. However, with the advances in reducing the size and increasing the capabilities of computing devices, users frequently have and use more than one device. For example, a user may have a laptop computer, a tablet computer, a smartphone and a desktop computer. It would be desirable, therefore, to allow users to seamlessly copy a file on one device and to paste it on another device. Furthermore, in copy/paste functionality, only the last-copied file may be pasted. Files copied before the last-copied file are no longer accessible through the copy/paste functionality. It would, therefore, also be desirable to also allow a user to choose which copied file he or she would like to paste.

SUMMARY

The subject disclosure relates to a computer-implemented method for performing a paste operation based on clipboard data from a first device and a second device. The method includes receiving, at the second device, a request to paste a last copied data item at the second device, accessing, from a server, a first timestamp for first data stored on the server and associated with a clipboard of the first device, the first timestamp corresponding to a time when the first data was copied to the clipboard on the first device, accessing, at the second device, a second timestamp for second data copied to a clipboard of the second device, the second timestamp corresponding to a time when the second data was copied to the clipboard on the second device and determining whether the last copied data item corresponds to the first data or the second data, by comparing the first timestamp and the second timestamp. The method also includes, in a case where the last copied data item corresponds to the first data, downloading the first data from the server, and pasting the first data at the second device and in a case where the last copied data item corresponds to the second data, pasting the second data from the clipboard of the second device.

The subject disclosure also relates to a machine-readable medium that includes instructions stored therein, which when executed by the processors, cause the processors to perform operations that include receiving, at a first client device, a request to paste a data item, accessing, from a server, a list of data items available at the server, wherein the server stores data items copied at a second client device and providing the accessed list of data items available at the server for display at the first client device. The operations also include receiving, at the first client device, a user selection of one or more data items from the list of data items available at the server, for pasting at the first client device and downloading the selected one or more data items from the server to a clipboard of the first client device.

The subject disclosure also relates to a system for performing a paste operation based on clipboard data from a first device and a second device. The system includes a command receiving module configured to receive, at the second device, a request to paste a last copied data item at the second device, an access module configured to access, from a server, a first timestamp for first data stored on the server and associated with a clipboard of the first device, the first timestamp corresponding to a time when the first data was copied to the clipboard on the first device and to access, at the second device, a second timestamp for second data copied to a clipboard of the second device, the second timestamp corresponding to a time when the second data was copied to the clipboard on the second device and a comparison module, configured to determine whether the last copied data item corresponds to the first data or the second data, by comparing the first timestamp and the second timestamp. The system also includes a pasting module configured to, in a case where the last copied data item corresponds to the first data, downloading the first data from the server, and pasting the first data at the second device and in a case where the last copied data item corresponds to the second data, pasting the second data from the clipboard of the second device, a data layout module, configured to identify spatial orientation information of the first data when downloading the first data from the server and a display module, configured to display the first data at the second device according to the identified spatial orientation, when first data is pasted at the second device.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
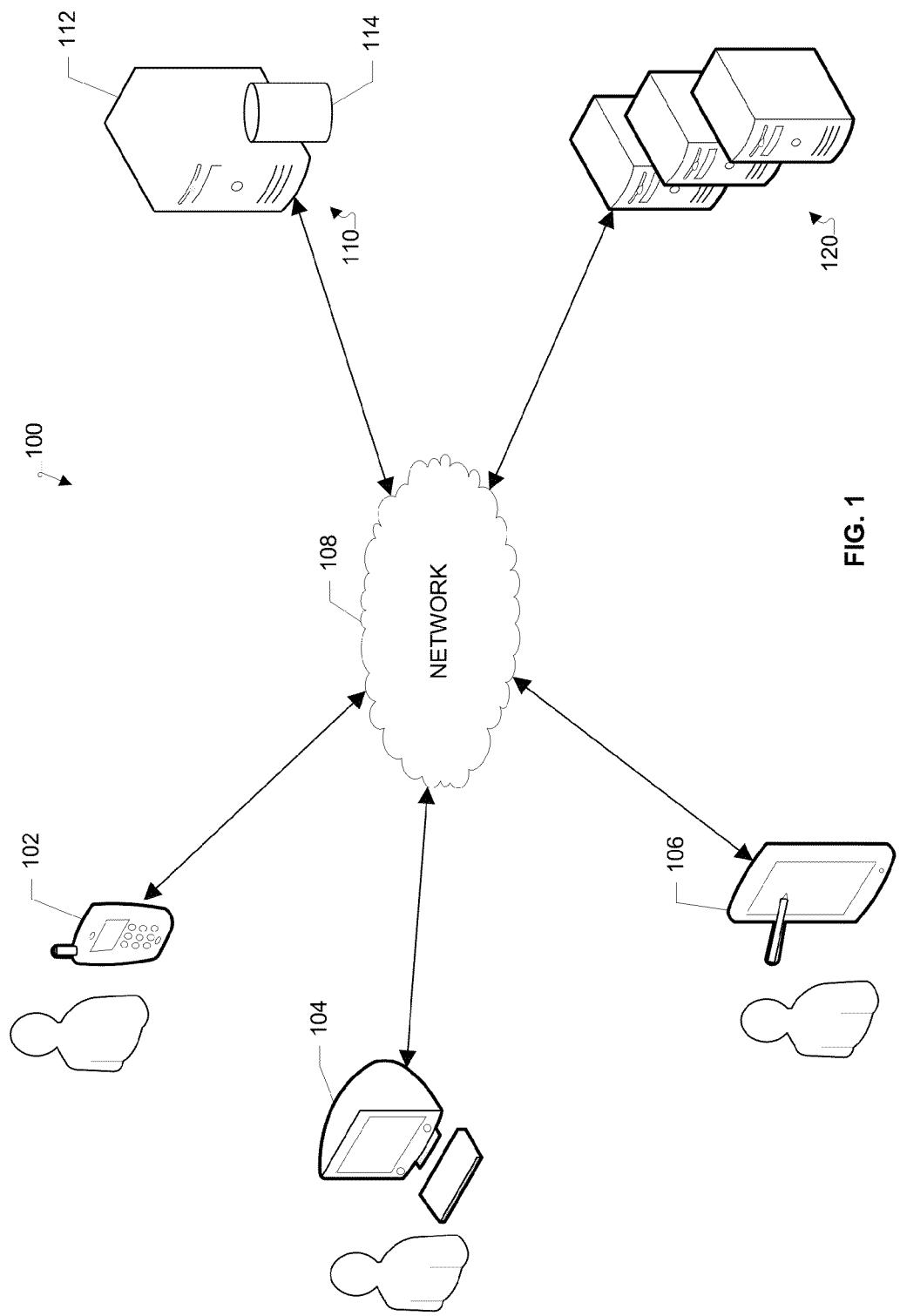
FIG. 1 is a diagram of an example system for performing a paste operation based on clipboard data from a first device and a second device.

In the following detailed description, numerous specific details are set forth to provide a full understanding of the present disclosure. It will be apparent, however, to one ordinarily skilled in the art that the configurations of the present disclosure may be practiced without some of these specific details. In other instances, well-known structures and techniques have not been shown in detail so as not to obscure the disclosure.

According to various aspects of the subject technology, methods and systems for a cloud clipboard are provided. A user may copy any type of data such as a document, a digital image, or any other kind of file on a first client device and be able to paste it on a second client device. For example, a user may call a copy function by executing a "CTRL-C" shortcut or by selecting "Copy" from an "Edit" menu or a right-click menu. When new data is selected and copied, the new data is added to a clipboard of the client device utilized by the user when copying the new data. Metadata providing new data details such as a time stamp, a file type, file name and file identifier, for example, is generated and stored along with the new data. According to an aspect of the disclosed technology, at least a time stamp is saved along with the new data.

From the clipboard of the first device, the new data and its associated metadata are transmitted to a paired server. The first device and the server are paired and permissions allowing the first device to upload data to the server are in place, when the processes discussed herein are performed. A second device, as used herein, is a computing client device that is also authenticated for sharing data with the first device and the server.

When an indication is received that a second device received a user request to paste a data item, for example, either through a "CTRL-V" short cut or by selecting "Paste" from an "Edit" menu, by right-clicking on a mouse or a mouse pad, or by another similar action, the requested data item that is sought by the second device is a last copied data item. In other words, it is assumed that the user wishes to paste the most recently copied data item. Thus, the system proceeds to determine whether the last copied data item is stored on the server or whether it resides at the clipboard of the second device (as a result of being copied to the clipboard locally, at the second device). The last copied data item determination is made by identifying data copied to the clipboard of the second device and comparing metadata associated with the identified data copied to the clipboard of the second device with metadata associated with the new data stored at the server.

Other data that has previously been stored at the server may also be compared to the identified data copied to the clipboard of the second device. When it is determined that the last copied data item is stored on the server, the last copied data item is downloaded from the server to the clipboard of the second device and pasted. When it is determined that the last copied data item is stored at the clipboard of the second device, the last copied data item is pasted from the clipboard of the second device.

Furthermore, a graphic user interface representing the contents of a clipboard at the server may be available at each paired client device. Users may drag and drop files at the graphic user interface representing the clipboard, and arrange the contents in a custom spatial relationship. A user may decide to group files based on file type, content topic or another user-specified parameter. Users may also be able to flick files into zones representing spatial "containers" for easier visual organization of data items in a clipboard.

For example, photographs may be flicked to a top left corner, while text documents may be flicked into a top right corner. Such zones are pre-defined by the user, or may be created with a first flick into an undefined zone.

The graphic user interface of the clip board may be designed to appear as a pin board, where the user may place items in a user-specified, custom order or arrangement. A user may drag and drop items into the graphic user interface representing the various contents. In such spatial organization, in addition to metadata identifying the file type, time stamp and file size, for example, metadata identifying the spatial coordinates may also be generated for a data item. For example, x and y coordinates of a data item may be added to the metadata. Data items may then be uploaded to the server according to the user-specified spatial orientation and metadata may be generated for the files. The generated metadata allows the server to replicate the customized spatial orientation created by the user.

Thus, a clipboard may act similarly to a pin board, rather than a traditional file repository that is organized based on file size, date, path, history, etc. The server may mimic the pinboard organization and make the customized clipboard available on multiple client devices. Users may then select from multiple previously copied files, when pasting a file on a client device. This is especially helpful when users copy multiple files and wish to have all copied files available for pasting. The spatial orientation is helpful to users who wish to forego the traditional "CTRL-C"/"CTRL-V" shortcuts and not use the "Edit" menu, but instead, to simply select a previously copied file, even when the previously copied file is not the last copied file. The files may be "dragged" and "dropped" to be pasted at a desired location, which may be another file, such as an email message, a social network post, or another data file.

According to one aspect, when a URL or a link is copied, only the link to the file is copied, instead of the full file, for easier transporting. When the file is pasted, the link is processed and full file content is delivered to the user.

The data items and corresponding metadata are synched across paired or authorized devices according to an online account, at which the user is logged in. That is, the spatial and historical data of the data items is stored in the online account and may be accessed by logging into the online account from any client device. Any client device may become a paired or authorized device, when the online account is accessed from that client device.

FIG. 1 illustrates an example client-server network environment which provides for performing a paste operation based on clipboard data from a first device and a second device. A network environment 100 includes a number of electronic devices 102, 104 and 106 communicably connected to a server 110 by a network 108. Server 110 includes a processing device 112 and a data store 114. Processing device 112 executes computer instructions stored in data store 114, for example, instructions to determine whether a last copied data item is stored on the server or copied to a clipboard of the second device. Data store 114 may also store information pertaining to data content at a client device and data contents at a server, for example. Processing device 112 may cause last copied data to be downloaded from a server to a client device, for example.

Servers 110 or application servers 120 may host an application within which some of the processes discussed herein are implemented, including but not limited to, a clipboard application. In some example aspects, electronic devices or client devices, as used interchangeably herein, 102, 104 and 106 can be computing devices such as laptop or desktop computers, smartphones, PDAs, portable media players, tablet computers, televisions or other displays with one or more processors coupled thereto or embedded therein, or other appropriate computing devices that can be used for displaying a web application.

Electronic devices 102-106 can be computing devices such as laptop or desktop computers, smartphones, PDAs, portable media players, tablet computers, televisions with one or more processors embedded therein and/or attached thereto, and/or other appropriate computing devices that can be used for associating contacts with corresponding system actions. In the example of FIG. 1, electronic device 102 is depicted as a smartphone, electronic device 104 is depicted as a desktop computer, and electronic device 106 is depicted as a PDA. A client is an application or a system that accesses a service made available by a server which is often (but not always) located on another computer system accessible by a network. Some client applications may be hosted on a website, whereby a browser is a client. Such implementations are within the scope of the subject disclosure, and any reference to client may incorporate a browser and reference to server may incorporate a website.

Application servers 120 may host various applications responsible for downloading content from a server to a device, comparing time stamps for content and storing content at a server. Application servers 120 may store content according to user-specified spatial orientation of the content. Application servers 120 are in communication with the electronic devices 102-106 through network 108. Each electronic device 102-106 may be a client device or a host device. In some example aspects, server 110 can be a single computing device such as a computer server. In other configurations, server 110 can represent more than one computing device working together to perform the actions of a server computer (e.g., cloud computing). The server 110 may host the web server communicationally coupled to the browser at the client device (e.g., electronic devices 102, 104 or 106) via network 108.

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
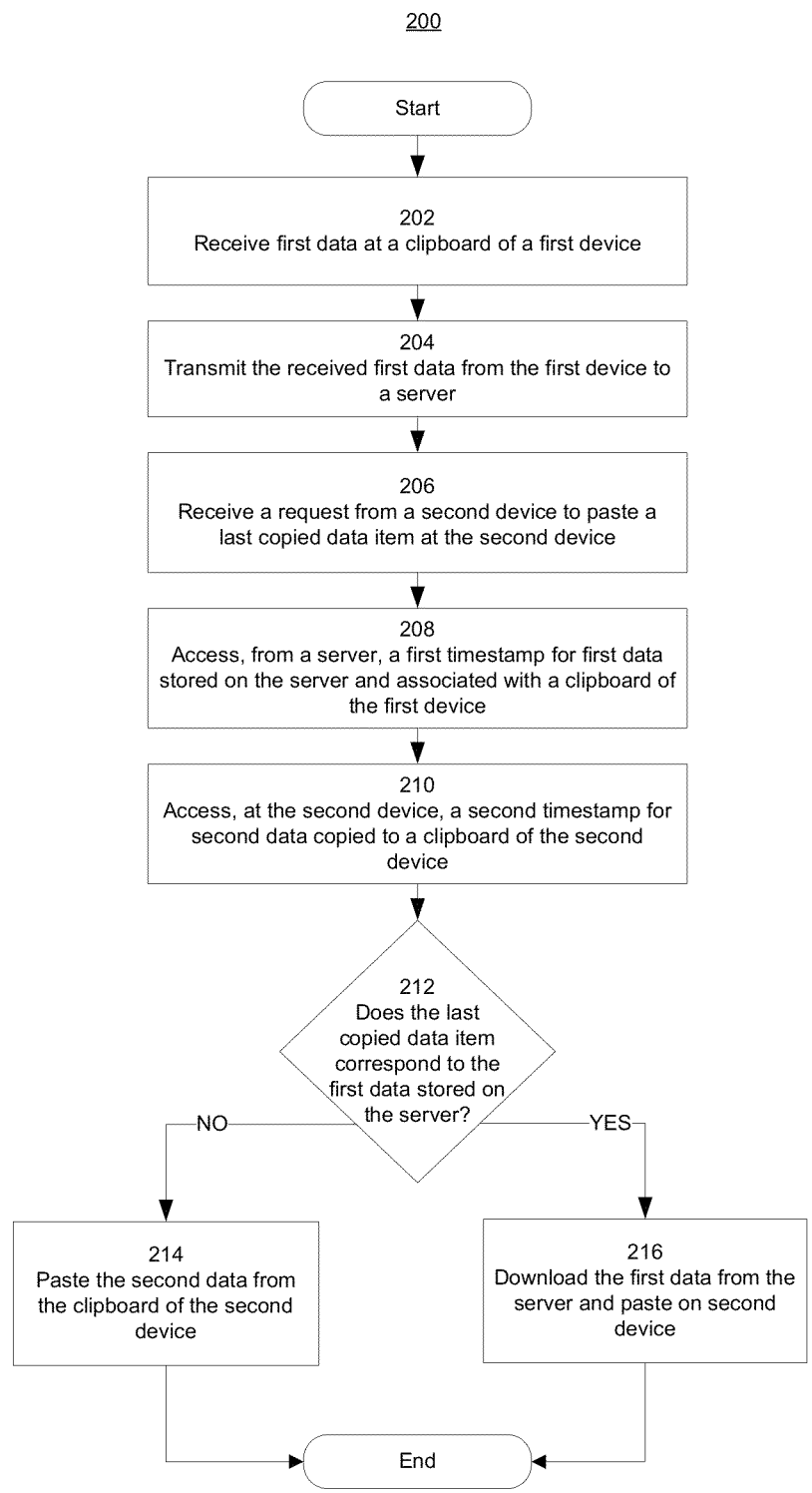
FIG. 2 illustrates a flow diagram of an example process for performing a paste operation based on clipboard data from a first device and a second device.

FIG. 2 illustrates a flow diagram of an example process 200 for performing a paste operation based on clipboard data from a first device and a second device. The process 200 starts by receiving first data at a clipboard of a first device at block 202. A user may select and copy any kind of data onto the clipboard by, for example, utilizing the "CTRL-C" shortcut, by selecting "Copy" from an "Edit" menu, by right-clicking on selected data or by other, similar methods for selecting and copying data. The copy command causes the selected data to be added to the clipboard of the first device.

When a user copies a file such as, for example, a document or an image, the whole file may be sent to the clipboard. However, when a file is a link, only the link is added to the clipboard. The link need not be realized and the referenced content need not be fetched. However, depending on implementation, the referenced content may be fetched and added along with the link.

Metadata for the received first data is generated and kept at the clipboard along with the received first data. Metadata includes at least a first time stamp (the time stamp for when the received first data was added to the clipboard). Metadata may also include a file type, file name, file path, and a file identifier for the received data. The received data may be automatically expunged from the clipboard after a predetermined amount of time, thirty days, for example, has elapsed.

According to an aspect of the disclosed technology, metadata for the first data also includes spatial orientation information for the received first data. That is, a file and corresponding data may be placed into a clipboard by a user. The user may fling or drag and drop the file into an area of the clipboard. Such manual placement of files into a clipboard also causes data to be added to the clipboard, similarly to the copy command discussed above.

The various areas of the clipboard may be associated with x and y coordinates, and the position in which the file is placed may, therefore, have an x and y coordinate. Files may be spatially arranged in the clipboard by the user. For example, a user may dedicate an area of the clipboard for photos, another area for personal documents and yet another area for music files. As such, files may be arranged spatially, rather than historically, by time stamp. The clipboard may, therefore, act similar to a pin board, and the user may place files into different, user-determined areas. Metadata corresponding to spatial organization information may also be included with the data added to the clipboard.

At block 204, the received first data is transmitted from the first device to a server, along with the first time stamp. The server may be one or several, communicationally connected servers. The received first data, including metadata (e.g., a first time stamp, spatial orientation information of the first data copied at the first device), is stored at the server. The server may have an API for a clipboard, which is in direct communication with the first device, through the various copy and paste functions. The clipboard hosted at the server may be integrated into the operating system of the various devices with which it communicates.

A user may specify, at the time the user selects a file for copying, whether the user wants to keep the file only locally or whether to upload the file to a server. A clipboard set-up menu may be utilized to enable the user to select his clipboard preferences. A user may also have more than one clipboard, where one clipboard is dedicated only to local functions, and an other clipboard to functions that concern a server and other remote devices. A user may thus switch between the different clipboards.

A customizable graphic user interface may represent the clipboard. The clipboard may appear to the user as a local clipboard, or as a clipboard that resides on a server, or as a combination of both, with different areas of a clipboard dedicated to different functions. For example, a left side of the clipboard may be dedicated to files that are intended to only be kept locally, while the right side of a clipboard may include files that can be uploaded to a server and the corresponding clipboard.

In operation, according to an aspect of the disclosed technology, when a user selects a file that is to be copied to a server, the file may first be copied locally and then sent to the server. Thus, the steps discussed with reference to block 202 may be invoked when a user selects files for adding to a server. According to another aspect of the disclosed technology, first data may be selected at a first device and be transmitted directly to a server, without being first copied locally. Thus, a selection of first data may be received at the first device and be directly transmitted to the server and the corresponding clipboard(s).

The received first data may be stored at the server until the server receives a request for the received first data from another device. The received first data may be automatically expunged from the server after a predetermined amount of time, thirty days, for example, has elapsed. Files that are accessed frequently (e.g., more than x number of times, where x is any value selected by the user) within the predetermined amount of time for expiring files, may be kept longer.

At block 206, a request is received from at a second device, to paste a last copied data item at the second device. A last copied data item is a data item with the most recent time stamp. The request to past the last copied data item may be made by a user by, for example, utilizing the "CTRL-V"

shortcut, by selecting "Paste" from an "Edit" menu, by a right-click command or by other, similar methods for pasting data.

At block 208, the system accesses, from the server, a first time stamp for the first data stored on the server and associated with a clipboard of the first device. The timestamp of the first data corresponds to the time when the first data was copied to the clipboard of the first device. At block 210, the system accesses, at the second device, a second time stamp for second data copied to a clipboard of the second device, the second timestamp corresponding to a time when the second data was copied to the clipboard of the second device.

At block 212, the system determines whether the last copied data item corresponds to the first data or the second data, by comparing the first timestamp and the second timestamp. The system thus checks whether the last copied data item is stored on the server or copied at a clipboard of the second device. The system makes such determination by comparing timestamp associated with the second data copied to the clipboard of the second device with timestamps associated with the first data stored at the server. When it is determined that the last copied data item corresponds to the second data, that is, the last copied data item is copied to the clipboard of the second device, the system pastes the last copied data item from the clipboard of the second device, as illustrated at block 214. When it is determined that the last copied data item corresponds to the first data, that is, the last copied data is stored on the server, the system pastes the last copied data item at the second device by downloading the first data from the server to the clipboard of the second device, as illustrated at block 216. The first data may be downloaded with the corresponding metadata, including the spatial orientation information. The first data may be pasted at the second device according to the spatial orientation information. The first data may be pasted at the second device according to the x and y coordinates of an area of the clipboard of the first device.

Figure 3A:
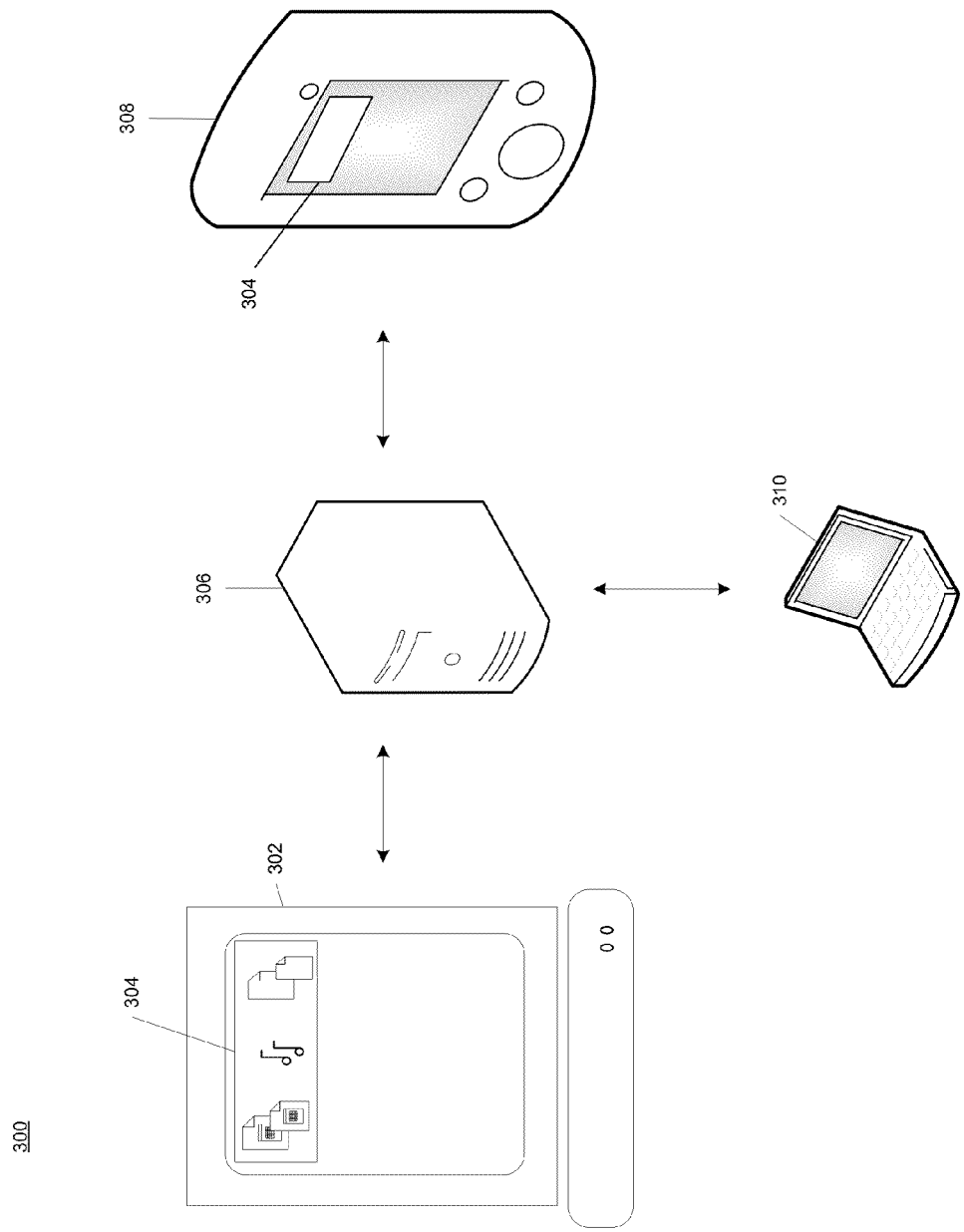
FIGS. 3A and 3B illustrate an example client-server network environment which provides for pasting data items from a clipboard hosted at a client device.
Figure 3B:
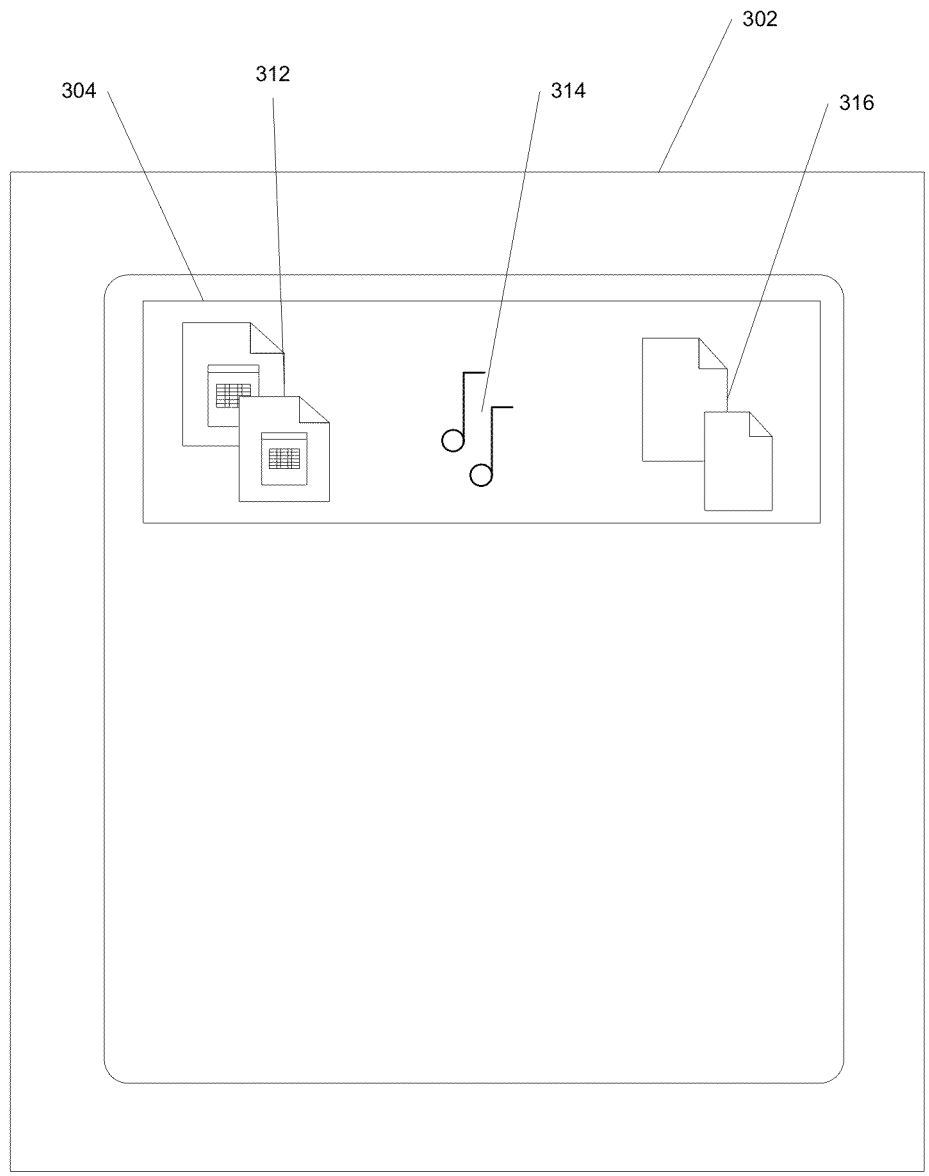

FIGS. 3A and 3B illustrate an example client-server network environment which provides for pasting data items from a clipboard hosted at a client device. FIG. 3A depicts a plurality of client devices 302, 308, and 310. Each client device is in communication with the server 306. Data may be transferred by each of the client devices 302, 308, and 310 to the server 306. Data may also be transferred from the server 306 to each of the client devices 302, 308, and 310. According to an aspect of the disclosed technology, client devices 302, 308, and 310 are logged in at a common online account, and permissions are in place for data to be shared between the client devices. Server 306 may be operated by an API of the common online account at which the client devices 302, 308, and 310 are logged in.

A request to copy a data item may be received at, for example client device 308. For example, a user may call a copy function by executing a "CTRL-C" shortcut or by selecting "Copy" from an "Edit" menu or a right-click menu. A user may also fling or drag and drop a file into a clipboard 304, to initiate the copy request. A graphic user interface for the clipboard 304 may be implemented that appears at every client device that is signed in at the online account with which the clipboard 304 is associated. The clipboard 304 may display all of its content at each device where the clipboard 304 is active.

When a copy request is received at a client device, for example, at client device 308, the selection of data is copied and transmitted from the client device 308 to the server 306. The transmitted selection of data is stored at server 306. As discussed previously, data items may be automatically expired by the system, if not used. The copied selection of data may likewise be stored at the locally at the client device from which the copy request was received. The client devices 302, 308, and 310 may have a local buffer, as well as a clipboard. The local buffer and the clipboard may be the same logical unit, or separate logical units.

Spatial orientation information may be identified for the copied selection of data The copied selection of data may be stored at the server 306 according to the identified spatial orientation information. For example, x and y coordinates may be added to the metadata for the copied selection of data. The x and y coordinates may determine the layout of the selection of data. For example, the coordinates may determine whether the selection of data should be placed at the top, bottom, left or right of a clipboard.

According to an aspect of the disclosed subject matter, a copy request may also include a request to cut or otherwise remove data. For example, text may be cut from a document, or a photograph may be cut from an album. Cut data may be treated similarly to copied data.

A request to paste a data item may be received at another client device in the plurality of client devices 302, 308, and 310. For example, the paste request may be received from client device 302. In response to the paste request, the system accesses from a server 306, a list of data items that are available at the server 306 and provided the list for display to the client device 302. A user may select one or more data items from the list of data items that are available at the server. To paste the selected data item, the selected data item is downloaded from the server to the client device 302. The data item may be added to the clipboard of device 302.

The pasted data may be displayed at the clipboard according to the spatial orientation information. That is, the placement of the pasted data in the clipboard may be the same as on the device where the data was copied.

Additionally, prior to downloading a data item from the server, a determination may be made regarding whether the selected data item is available at the clipboard of the client device 302. If a selected data item is available at the clipboard of the client device 302, the data item is pasted from the clipboard of the client device 302. Otherwise, the selected data item is downloaded from the server 306 and pasted at the client device 302. The spatial orientation information for the selected data may be downloaded along with the selected data, and selected data may be pasted according to the spatial orientation information. The selected data may be pasted at a clipboard of the client device 302 or elsewhere at the client device 302.

Another view of the clipboard 304 is shown in FIG. 3B. The clipboard may be an area of the screen, an icon, a designated receptacle, a dedicated window or any other similar mechanism. Clipboard 304 at client device 302 may include picture files 312, music files 314 and text documents 316. A user may place files into the clipboard by initiating a copy function, by dragging and dropping a file, or by flinging a file into the clipboard. The files may be organized spatially, that is, according to a physical layout, rather than history or age. The layout may be similar to a pin board, where the user determines how the files are displayed in relation to the clipboard and to other files. Areas may be designated by a user, whereby each area is for a particular kind of files. For example, the right side may be for text documents, the middle may be for music files, and the left side may be for pictures. Top may be for personal files, while the bottom may be for shared files. The user may determine the areas by repeatedly placing specific types of files into corresponding areas of the clipboard.

A clipboard 304 of a client device 310 or any other client device may be synchronized with the server 306 by causing data at the server to download to the clipboard of the client device 310 when new data is added to the server 306 from any other client device.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
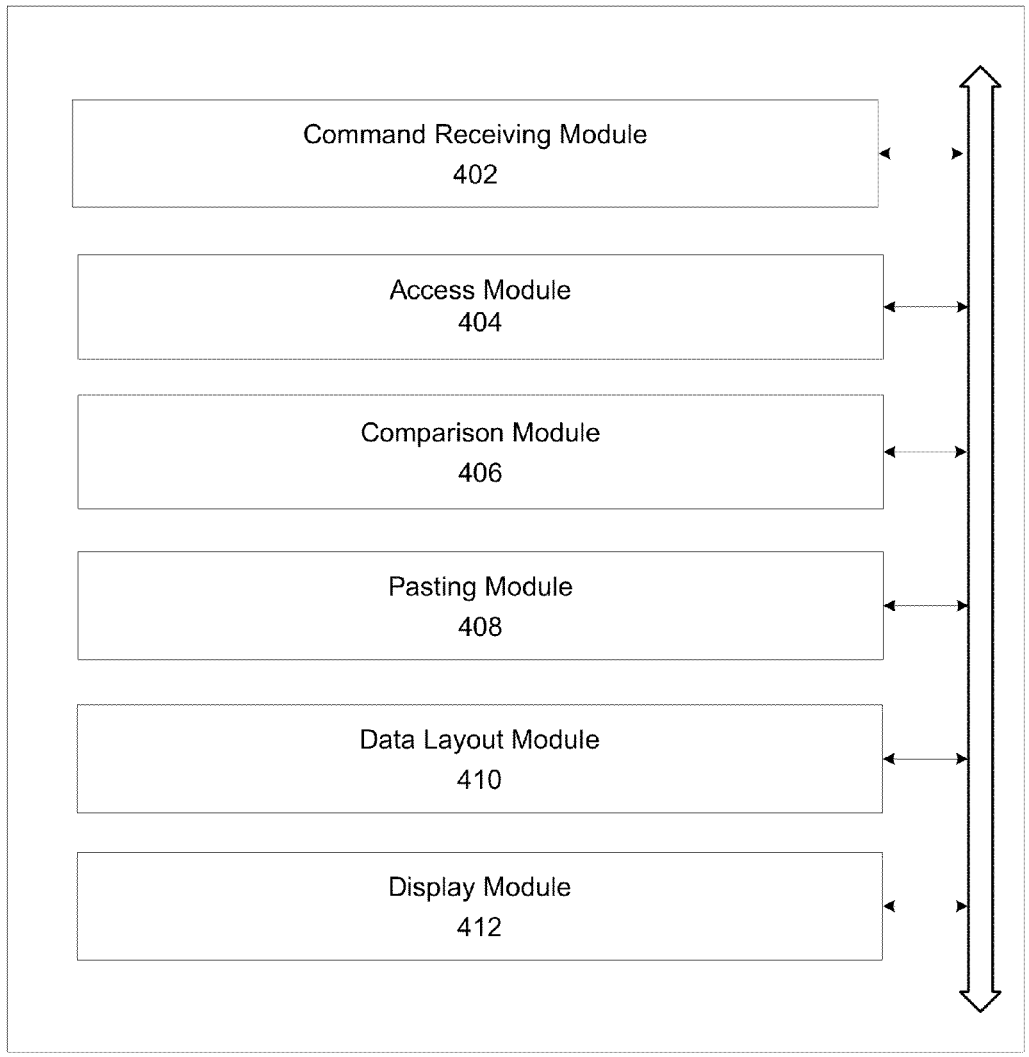
FIG. 4 conceptually illustrates an example of system for performing a paste operation based on clipboard data from a first device and a second device.

FIG. 4 illustrates an example of system 400 for performing a paste operation based on clipboard data from a first device and a second device, in accordance with various aspects of the subject technology. System 400 comprises a command receiving module 402, an access module 404, a comparison module 406, a pasting module 408, a layout module 410, and a display module 412.

The command receiving module 402 is configured to receive, at a second device, a request to paste a last copied data item at the second device. The access module 404 is configured to access, from a server, a first timestamp for first data stored on the server and associated with a clipboard of a first device, the first timestamp corresponding to a time when the first data was copied to the clipboard on the first device and to access, at the second device, a second timestamp for second data copied to a clipboard of the second device, the second timestamp corresponding to a time when the second data was copied to the clipboard on the second device. The comparison module 406 is configured to determine whether the last copied data item corresponds to the first data or the second data, by comparing the first timestamp and the second timestamp. The pasting module 408 is configured to, in a case where the last copied data item corresponds to the first data, downloading the first data from the server, and pasting the first data at the second device and in a case where the last copied data item corresponds to the second data, pasting the second data from the clipboard of the second device. The data layout module 410 is configured to identify spatial orientation information of the first data when downloading the first data from the server and the display module 412 is configured to display the first data at the second device according to the identified spatial orientation, when first data is pasted at the second device.

These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 5:
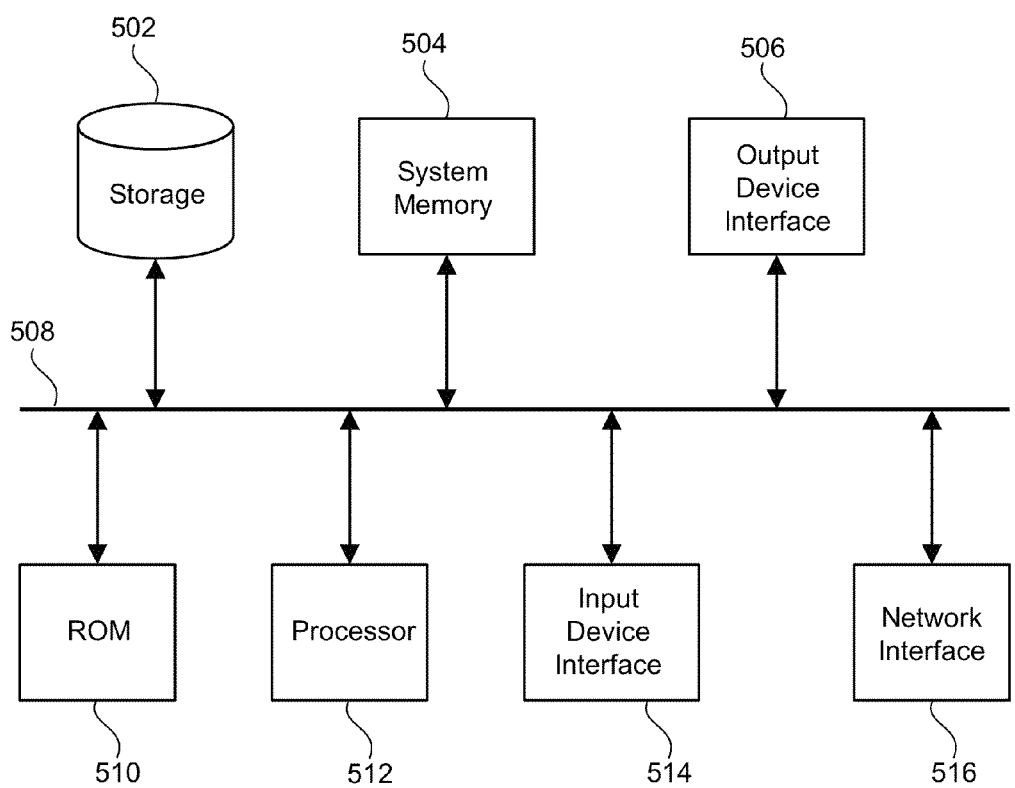
FIG. 5 conceptually illustrates an example electronic system with which some aspects of the subject technology are implemented.

FIG. 5 conceptually illustrates an electronic system with which some aspects of the subject technology are implemented. Electronic system 500 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as televisions or other displays with one or more processors coupled thereto or embedded therein, or other appropriate computing devices that can be used for running an application. Some implementations include devices such as a touch screen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a device having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method for performing a paste operation based on clipboard data from a first device and a second device, the method comprising:
   receiving, at the second device, a request to paste a last copied data item at the second device;
   accessing, from a server, a first timestamp for first data stored on the server and associated with a clipboard of the first device, the first timestamp corresponding to a time when the first data was copied to the clipboard on the first device;
   accessing, at the second device, a second timestamp for second data copied to a clipboard of the second device, the second timestamp corresponding to a time when the second data was copied to the clipboard on the second device, wherein the second device comprises an application with a customizable graphic user interface having different areas dedicated to local or server functions corresponding to the clipboard of the second device, wherein the second device comprises at least one area dedicated to local functions and at least one area dedicated to server functions;
   determining whether the last copied data item corresponds to the first data or the second data, by comparing the first timestamp and the second timestamp;
   in a case where the last copied data item corresponds to the first data, downloading the first data from the server, and pasting the first data at the second device; and
   in a case where the last copied data item corresponds to the second data, pasting the second data from the clipboard of the second device.

2. The computer-implemented method of claim 1, further comprising:
   identifying spatial orientation information of the first data, when downloading the first data from the server.

3. The computer-implemented method of claim 2, wherein downloading the first data from the server further comprises downloading the identified spatial orientation information of the first data.

4. The computer-implemented method of claim 2, wherein the first data is stored at the server according to the identified spatial orientation information of the first data.

5. The computer-implemented method of claim 2, wherein the spatial orientation information of the first data is identified based on user interaction with the first data, the user interaction with the first data comprising creating a defined zone by moving the first data into an undefined zone, wherein the defined zone defines a spatial container for visual organization of similar items on the clipboard, wherein the undefined zone is an area of the clipboard not designated as a defined zone.

6. The computer-implemented method of claim 2, wherein pasting the first data at the second device comprises pasting the first data at the second device according to the identified spatial information of the first data.

7. The computer-implemented method of claim 2, wherein the spatial orientation information comprises an x coordinate and a y coordinate corresponding to clipboard areas.

8. The computer-implemented method of claim 1, wherein the first data is stored at the server according to the time stamp.

9. The computer-implemented method of claim 1, further comprising:
   synchronizing the clipboard of the second device with the server by causing copy data at the server to download to the clipboard of the second device.

10. The computer-implemented method of claim 1, wherein the first device and the second device are associated with a common online user account.

11. A system for performing a paste operation based on clipboard data from a first device and a second device, the system comprising:
   a command receiving module, configured to receive, at the second device, a request to paste a last copied data item at the second device;
   an access module, configured to access, from a server, a first timestamp for first data stored on the server and associated with a clipboard of the first device, the first timestamp corresponding to a time when the first data was copied to the clipboard on the first device and to access, at the second device, a second timestamp for second data copied to a clipboard of the second device, the second timestamp corresponding to a time when the second data was copied to the clipboard on the second device, wherein the first device comprises an application with a customizable graphic user interface having different areas dedicated to local or server functions corresponding to the clipboard of the first device and the second device comprises an application with a customizable graphic user interface having different areas dedicated to local or server functions corresponding to the clipboard of the second device, wherein each of the first and second devices comprise at least one area dedicated to local functions and at least one area dedicated to server functions;

a comparison module, configured to determine whether the last copied data item corresponds to the first data or the second data, by comparing the first timestamp and the second timestamp;

a pasting module, configured to, in a case where the last copied data item corresponds to the first data, downloading the first data from the server, and pasting the first data at the second device and in a case where the last copied data item corresponds to the second data, pasting the second data from the clipboard of the second device;

a data layout module, configured to identify spatial orientation information of the first data when downloading the first data from the server; and a display module, configured to display the first data at the second device according to the identified spatial orientation, when first data is pasted at the second device.

12. A non-transitory machine-readable medium comprising instructions stored therein, which when executed by the processors, cause the processors to perform operations comprising:

receiving, at the second device, a request to paste a last copied data item at the second device;

accessing, from a server, a first timestamp for first data stored on the server and associated with a clipboard of the first device, the first timestamp corresponding to a time when the first data was copied to the clipboard on the first device;

accessing, at the second device, a second timestamp for second data copied to a clipboard of the second device, the second timestamp corresponding to a time when the second data was copied to the clipboard on the second device, wherein the second device comprises an application with a customizable graphic user interface having different areas dedicated to local or server functions corresponding to the clipboard of the second device, wherein the second device comprises at least one area dedicated to local functions and at least one area dedicated to server functions;

determining whether the last copied data item corresponds to the first data or the second data, by comparing the first timestamp and the second timestamp;

in a case where the last copied data item corresponds to the first data, downloading the first data from the server, and pasting the first data at the second device; and in a case where the last copied data item corresponds to the second data, pasting the second data from the clipboard of the second device.

13. The non-transitory machine-readable medium of claim 12, the operations further comprising:

identifying spatial orientation information of the first data, when downloading the first data from the server.

14. The non-transitory machine-readable medium of claim 13, wherein downloading the first data from the server further comprises downloading the identified spatial orientation information of the first data.

15. The non-transitory machine-readable medium of claim 13, wherein the first data is stored at the server according to the identified spatial orientation information of the first data.

16. The non-transitory machine-readable medium of claim 13, wherein the spatial orientation information of the first data is identified based on user interaction with the first data, the user interaction with the first data comprising creating a defined zone by moving the first data into an undefined zone, wherein the defined zone defines a spatial container for visual organization of similar items on the clipboard, wherein the undefined zone is an area of the clipboard not designated as a defined zone.

17. The non-transitory machine-readable medium of claim 13, wherein pasting the first data at the second device comprises pasting the first data at the second device according to the identified spatial information of the first data.

18. The non-transitory machine-readable medium of claim 13, wherein the spatial orientation information comprises an x coordinate and a y coordinate corresponding to clipboard areas.

19. The non-transitory machine-readable medium of claim 12, wherein the first data is stored at the server according to the time stamp.

20. The non-transitory machine-readable medium of claim 12, the operations further comprising:

synchronizing the clipboard of the second device with the server by causing copy data at the server to download to the clipboard of the second device.

21. The non-transitory machine-readable medium of claim 12, wherein the first device and the second device are associated with a common online user account.

* * * * *